United States Patent [19]

Spletzer et al.

[11] Patent Number: 4,523,377

[45] Date of Patent: Jun. 18, 1985

[54] BABY BOTTLE CAP ASSEMBLER

[75] Inventors: Barry Spletzer, Lansing; George J. Swiatlowski; Maurice W. Brandt, both of Fremont, all of Mich.

[73] Assignee: Gerber Products Company, Fremont, Mich.

[21] Appl. No.: 554,426

[22] Filed: Nov. 22, 1983

[51] Int. Cl.³ .................. B23P 21/00; B23P 19/00
[52] U.S. Cl. .................................. 29/773; 29/786; 29/793
[58] Field of Search ............ 29/711, 773, 771, 783, 29/786, 787, 789, 791–797

[56] References Cited

U.S. PATENT DOCUMENTS

| | | | |
|---|---|---|---|
| 389,648 | 9/1888 | Hamilton | 29/786 |
| 2,792,578 | 5/1957 | Avtio | 29/786 |
| 3,029,176 | 4/1962 | Schoonmaker | 29/773 |
| 3,054,170 | 9/1962 | Benichasa et al. | 29/794 |
| 3,378,767 | 4/1968 | Dixon | 29/792 |
| 3,382,646 | 5/1968 | Leudtke et al. | 29/773 |
| 4,177,548 | 12/1979 | Yarick et al. | 29/773 |
| 4,345,963 | 8/1982 | Braler | 29/793 |
| 4,355,495 | 10/1982 | Lewis et al. | 29/794 |

Primary Examiner—Mark Rosenbaum
Assistant Examiner—Steven Nichols
Attorney, Agent, or Firm—Townsend and Townsend

[57] ABSTRACT

A baby bottle top assembler automatically assembles nipple, collar and hood cap components into a unitary structure. Nipple, collar and hood feeders serially supply the cap components to pickup points. The feeders each include a hopper for holding the cap components, a conveyor for removing the cap components from the hopper and a magazine assembly for serially feeding the cap components to the pickup points adjacent the assembly wheel. Pickup pins pass the pickup points and first engage a nipple, then a collar and finally a hood. The components are snapped together into a unitary structure by a pinch roller. The unitary nipple/collar/hood assembly is removed from the pickup pin by an assembly stripper having fingers which engage under the nipple/collar/hood assembly forcing it off the pickup pin.

23 Claims, 17 Drawing Figures

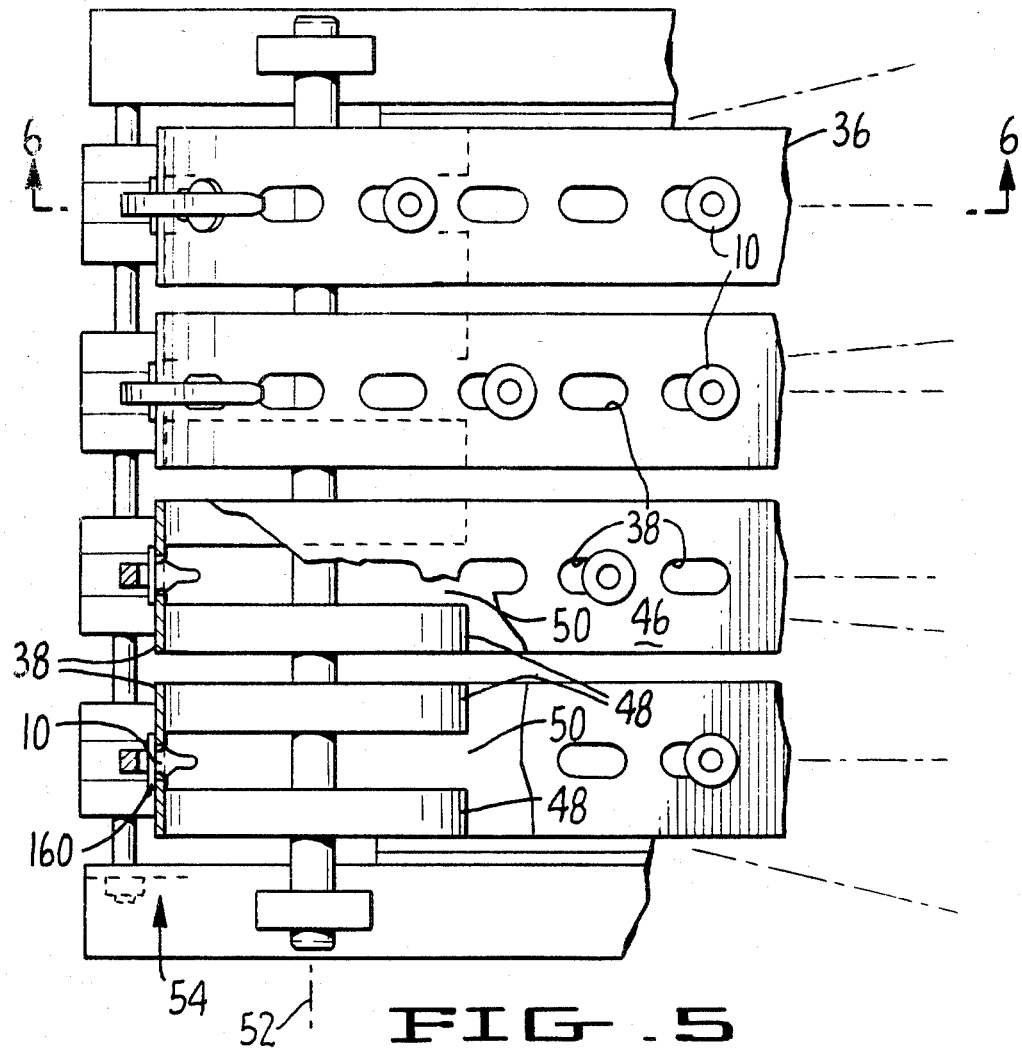
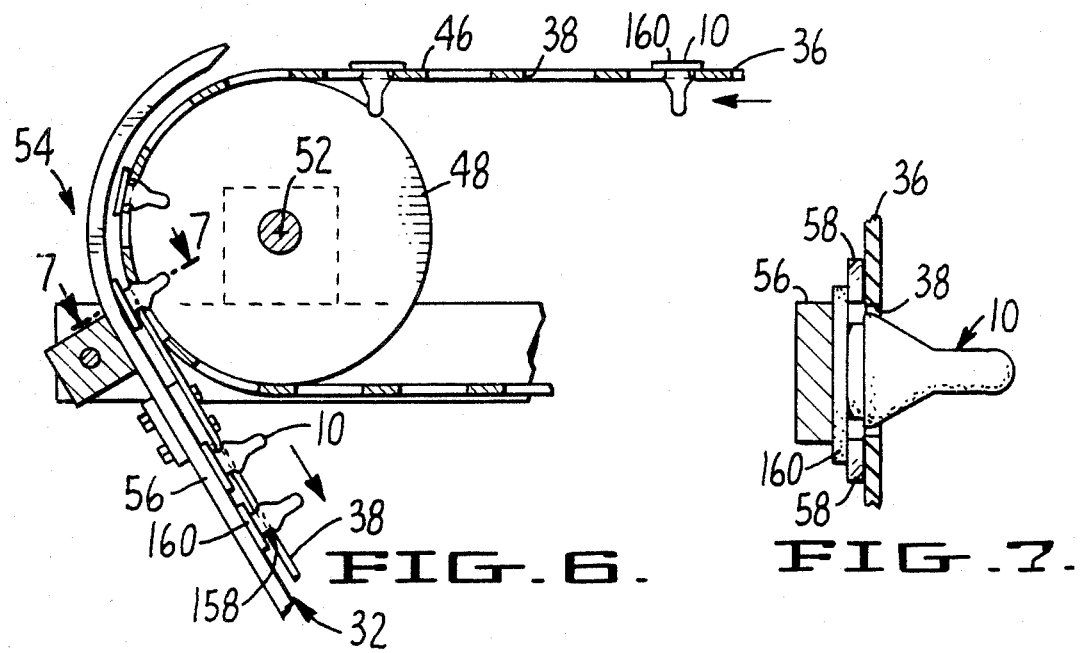

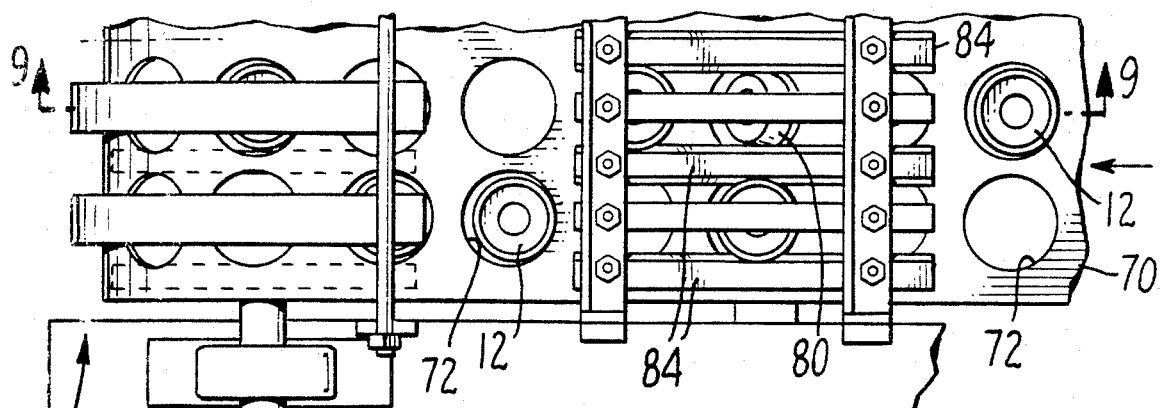
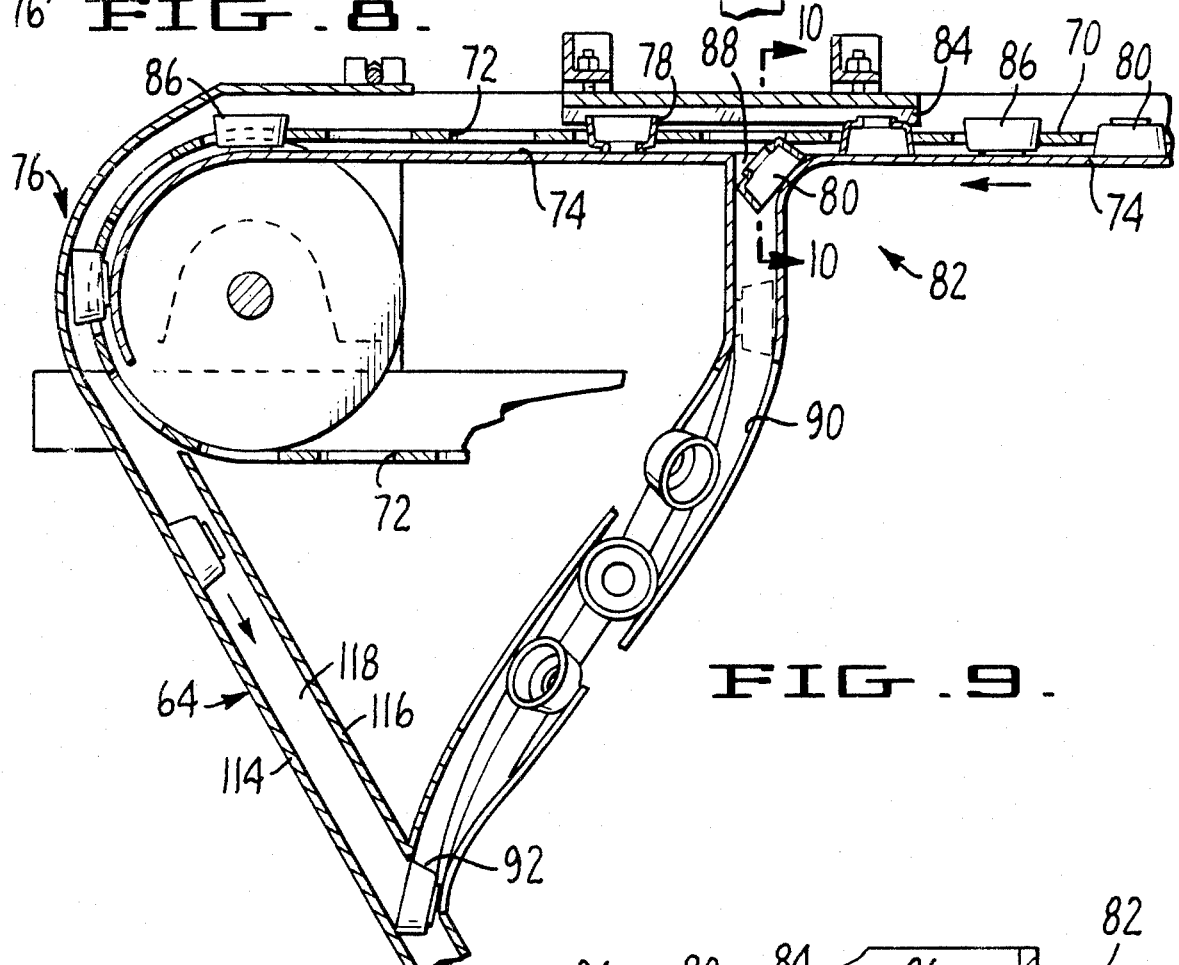
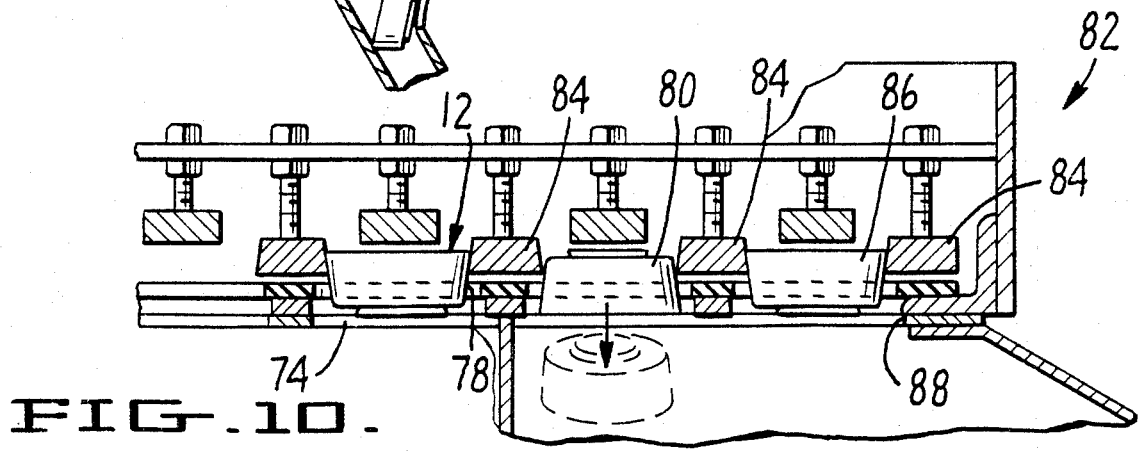

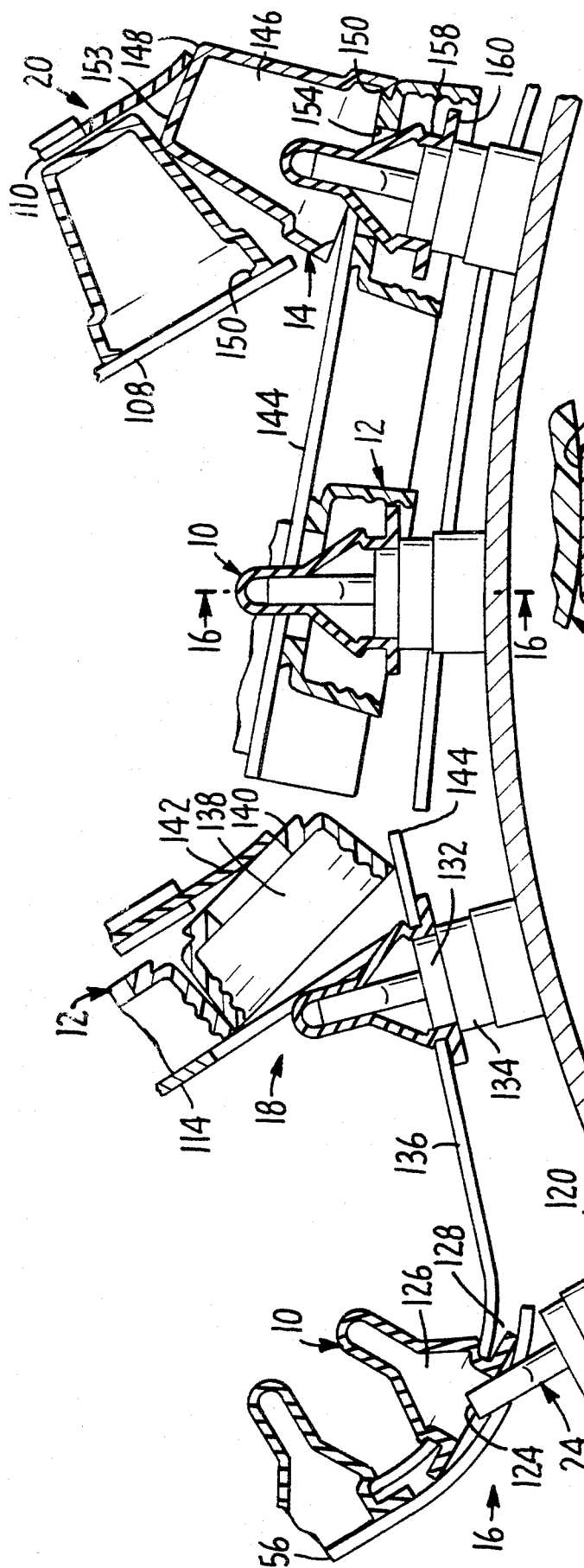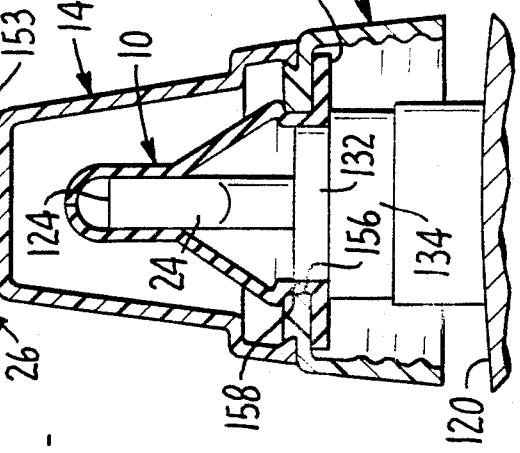

BABY BOTTLE CAP ASSEMBLER

BACKGROUND OF THE INVENTION

One type of a conventional baby bottle includes a container and a multi-component cap. The cap typically includes a nipple secured to the mouth of the container by a threaded collar. The collar is generally cylindrical, often having a slight taper, and includes a central opening through which the nipple extends. A hood fits over the portion of the nipple extending through the central opening in the collar to shield the nipple when not in use. The hood typically snaps onto the upper surface of the collar. This is commonly accomplished by providing the lower edge of the hood with an inwardly extending bead for engagement with a complementary circular lip formed about the central opening of the collar. The nipple includes a flange at its lower end sized to fit within the collar between the collar and the rim of the container. A locking groove is formed just above the flange and is sized for complementary engagement within the central opening.

The baby bottle cap components are typically preassembled, that is, the nipple is mounted within the collar and the hood is arranged onto the collar covering the nipple, to allow the assembled cap components to be mounted as a unit to the top of the container. This has proven to be a time-consuming, labor-intensive procedure, thus adding to the cost of the product.

SUMMARY OF THE INVENTION

The present invention is directed to apparatus which efficiently and quickly assembles the components of a baby bottle cap and automatically rejects those improperly assembled.

The baby bottle cap assembler of the inventor automatically assembles a nipple, collar and hood into a unitary structure. The nipple, collar and hood will sometimes be referred to this application as the cap components. The assembler includes nipple, collar and hood feeders which serially supply nipples, collars and hoods to pickup points adjacent the periphery of an assembly wheel. The pickup points are along the top of the assembly wheel. The assembly wheel includes a number of radially extending pickup pins which first engage the interior of a nipple at the nipple pickup point then advance it to the collar pickup point. A collar, at the collar pickup point, is engaged by the nipple carried by the pickup pin and is removed from the collar feeder by the passing nipple. The nipple and collar are carried by the pickup pin past the the hood pickup point at which a hood is stripped from the hood feeder.

The nipple, collar and hood are snapped together immediately after leaving the hood pickup point by a pinch roller. The pinch roller presses against the top of the hood pushing down on the hood thus seating the nipple within the collar and snapping the hood onto the collar.

The nipple/collar/hood cap assembly is removed from the assembly wheel by an assembly stripper. The assembly stripper is located at the bottom of the assembly wheel. The assembly stripper includes a pair of fingers, the tips of which lie between the periphery of the assembly wheel and the edges of the collar. As the cap assembly passes the stripper, the stripper fingers engage the lower edge of the collar forcing the cap assembly off the pickup pin. The cap assembly drops to an assembly region below the assembly wheel and is carried away by an assembly conveyor.

In the disclosed embodiment, the feeders each include a hopper for holding quantities of the components, a conveyor for removing the components from the hopper, and a magazine assembly for serially feeding the components from the conveyor to the pickup point adjacent the assembly wheel. The magazine assembly preferably includes a generally upright magazine so the components are gravity fed to the pickup point. The conveyor includes a belt having a number of holes sized so that the appropriate top component will fit within the holes and be carried from the hopper to the magazine assembly via the belt. Top components which are not properly seated within the holes of the belt are swept back down the belt towards the hopper by a horizontally disposed cylindrical reject brush mounted just above the belt.

The top components are transferred from the belt to the magazine as the belt passes around a transfer roller. The open upper end of the magazine is situated adjacent the periphery of the transfer roller below the center line of the roller so that as the top components pass about the transfer roller they drop from the holes in the belt and into the magazine. The lower end of the magazine defines the pickup point for the top component. The magazine lower ends are configured to present the various top components at the proper position adjacent the periphery of the assembly wheel so that the components can be engaged by and removed from their respective pickup points by a passing pickup pin.

The holes in the collar conveyor belt are large enough so that collars can fit within the holes in one of two orientations, one proper and one improper. A collar diverter is used to divert collars having an improper orientation from the conveyor path so that only collars having the proper orientation are fed into the collar magazine. The improperly oriented collars are directed along a diverter path which turns them over 180° to reorient them to the proper orientation. These reoriented collars are then fed to the collar magazine at a point below the top of the magazine.

One of the primary advantages of the present invention is that randomly oriented cap components are quickly and efficiently assembled without human intervention. The assembler of the invention takes these randomly oriented components, conveys them away from their jumbled condition in their hoppers and transfers properly oriented ones to their associated magazines. The components are serially stripped from the pickup points, assembled by the assembly wheel and pinch roller and removed by the assembly stripper.

Another advantage of the invention is that improperly assembled cap components are directed into their own reject regions below the assembly wheel. Unless all three components are present, the pinch roller will not cause the cap components to be forced into mating engagement with one another. Therefore, as the assembly wheel rotates, loose hood components fall off first, then loose collars fall off and then finally nipples are stripped from the pickup pins. Unless all three components are properly present, the hood never becomes snapped onto the collar to allow the hood to fall freely away from the collar or nipple. If a nipple or a hood is absent, the collar is never forced fully onto a nipple so that it can fall freely from the assembly wheel into a collar reject region before reaching the assembly stripper. By the time the pickup pins reach the nipple stripper, the only thing which can be left on the pickup pins are nipples which are then stripped from the pickup pins into the nipple reject region.

Other features and advantages of the present invention will appear from the following description in which the preferred embodiment has been set forth in detail in conjunction with the accompanying drawings.

BRIEF DESCRIPTION OF THE DRAWINGS

FIG. 5 is a top view taken in the direction of line 5—5 of FIG. 1 at the nipple transfer point.

FIG. 6 is a partial cross-sectional view of the nipple transfer point taken along lines 6—6 of FIG. 5.

FIG. 7 is an enlarged view of a nipple within the nipple magazine.

FIG. 8 is a top view of the collar conveyor transfer point.

FIG. 9 is a cross-sectional view of the collar conveyor and collar magazine at the collar transfer point showing the collar diverter.

FIG. 10 is a cross-sectional view of the collar conveyor taken along line 10—10 of FIG. 9.

FIG. 15 is an enlarged cross-sectional view of the pickup points of FIG. 14.

FIG. 16 is a cross-sectional view taken along line 16—16 of FIG. 15.

FIG. 17 is an enlarged cross-sectional view showing the engagement of the pinch roller with the top of the hood.

DETAILED DESCRIPTION OF THE PREFERRED EMBODIMENT

Figure 1:
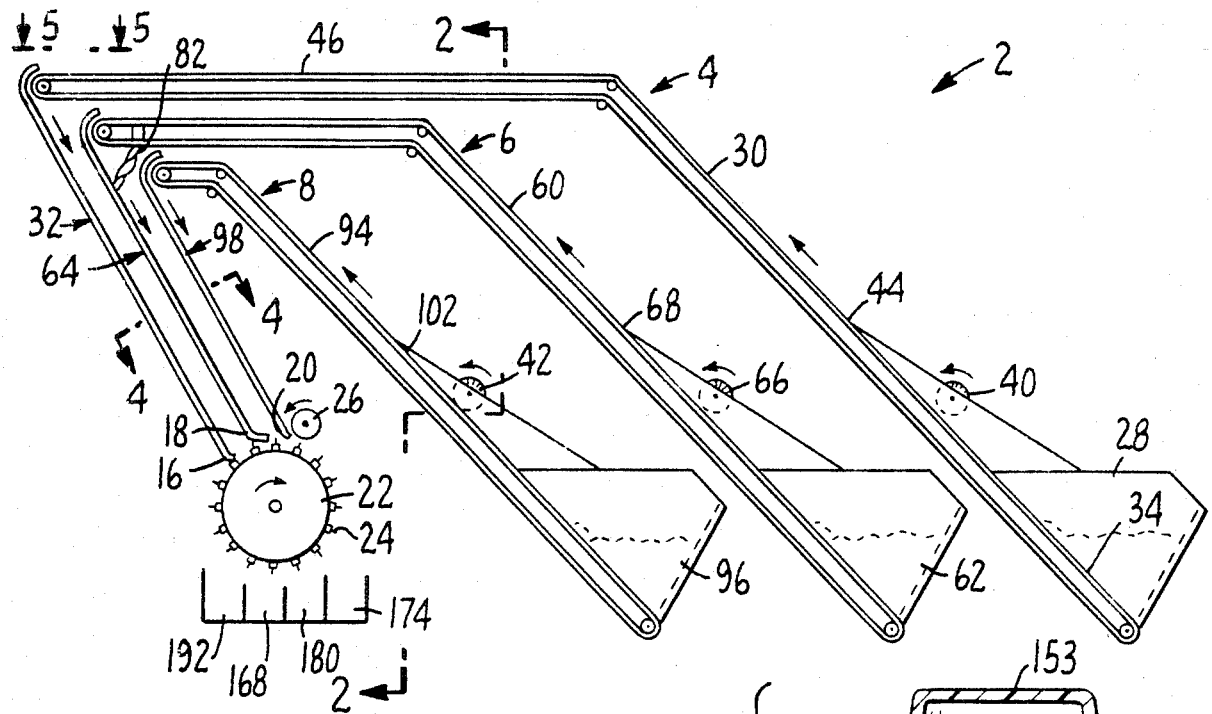
FIG. 1 is a simplified side view of a baby bottle cap assembler made according to the present invention.
Figure 2:
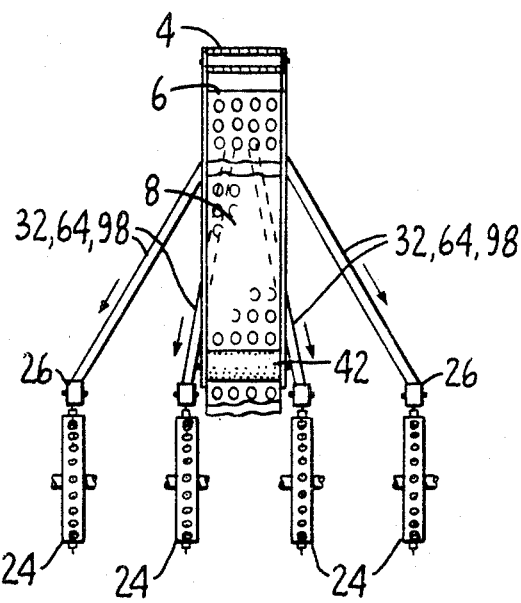
FIG. 2 is a side cross-sectional view of the assembler of FIG. 1 taken along line 2—2.
Figure 3:
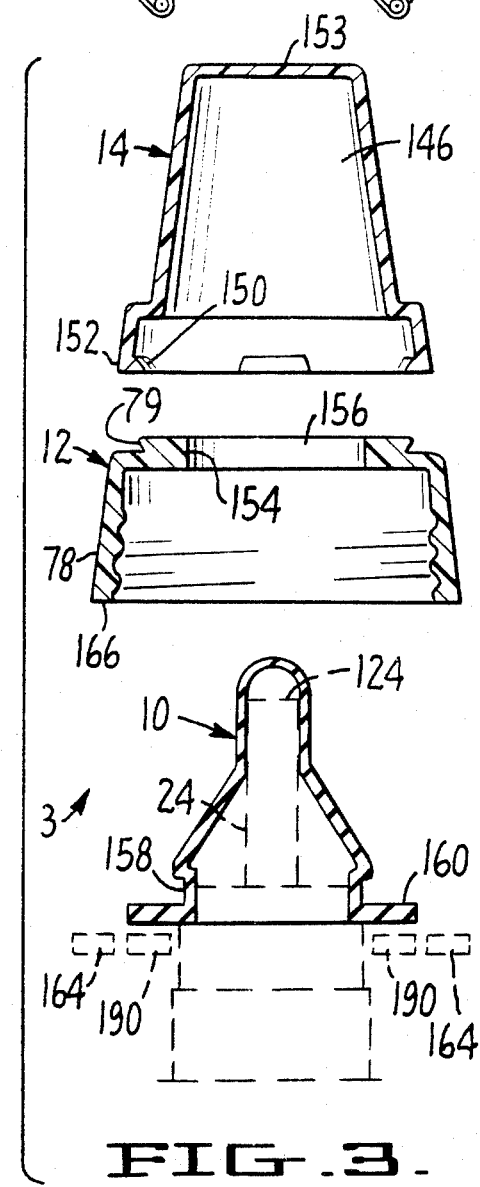
FIG. 3 is an enlarged exploded assembly of the baby bottle cap components shown in relation to a pickup pin and nipple and assembly stripper fingers.

Turning now to FIGS. 1-3, baby bottle cap assembler 2 of the invention will be described. Assembler 2 is used to assemble baby bottle caps 3 and includes a nipple feeder 4, a collar feeder 6 and a hood feeder 8 which feed nipples 10, collars 12 and hoods 14 to their associated nipple, collar and hood pickup points 16, 18 and 20 adjacent the periphery of an assembly wheel 22. Nipples 10, collars 12 and hoods 14, collectively termed cap components, are assembled together as the radially extending pickup pins 24 serially engage and remove nipples 10, collars 12 and hoods 14 from their respective pickup points 16, 18 and 20; the three components are snapped together by a pinch roller 26 immediately following hood pickup point 20.

Assembler 2 will be described in the following manner. First, feeders 4, 6, and 8, and their associated components and assemblies will be described. Next assembly wheel 22 and its related structures will be described. Finally, the operation of cap assembler 2 will be discussed.

NIPPLE FEEDER

Nipple feeder 4 includes a nipple hopper 28, a nipple conveyor 30 and a nipple magazine 32. A first portion 34 of conveyor 30 passes within nipple hopper 28 which contains a supply of nipples 10. Nipple conveyor 30 continues upwardly from nipple hopper 28 at an angle to the horizontal. Referring also to FIGS. 5-7, nipple conveyor 30 includes four nipple conveyor belts 36 having nipple openings 38 formed through belts 36. Each belt with openings 38 is used to feed nipples 10 to a separate nipple magazine 32 which feeds an associated assembly wheel 22. However, for simplicity, only one belt 36 with openings 38 and its associated magazine 32 and assembly wheel 22 will be described.

Figure 11:
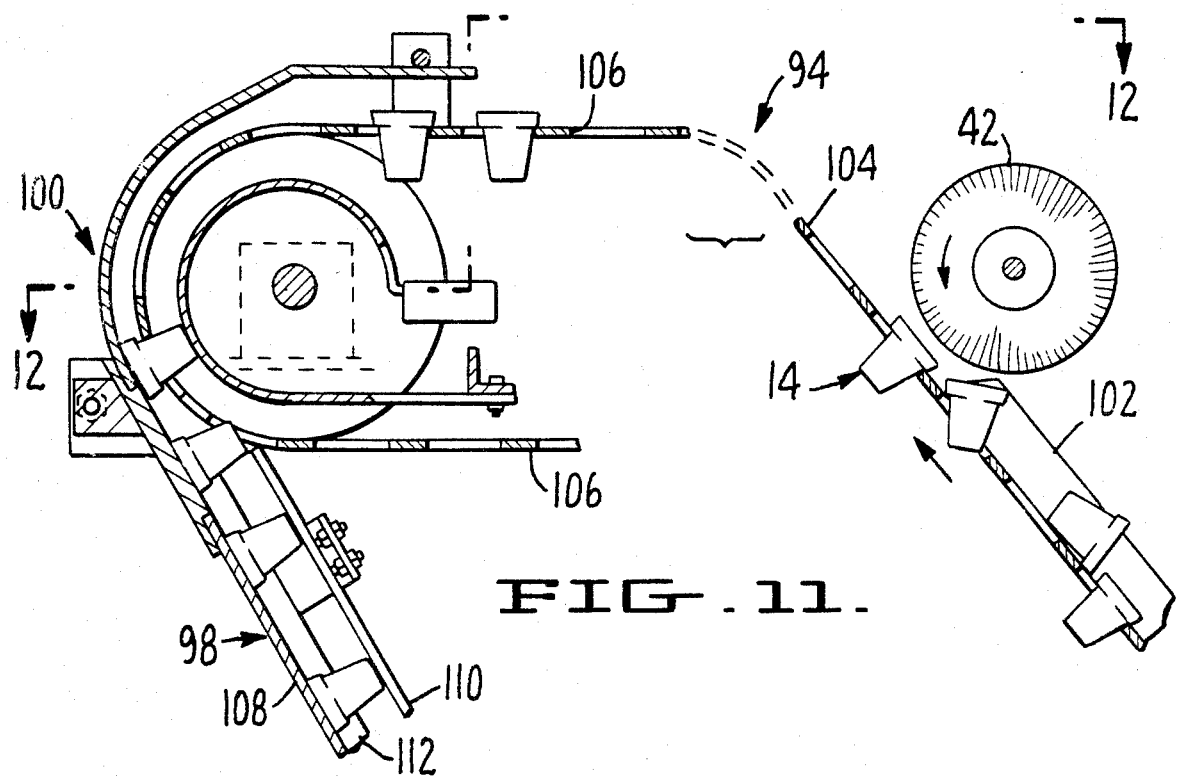
FIG. 11 is a side view of the hood conveyor showing the hood conveyor transfer point and the hood reject brush.

As belt 36 passes under the supply of nipples 10 within hoppers 28, the tips of some nipples engage openings 38 and are carried away by belt 36. Other nipples may be carried up belt 36 from region 34 but not be properly supported within openings 38. See FIG. 11 which shows two improperly positioned hoods 14. The improperly positioned nipples are swept back down belt 36 towards hopper 28 by a nipple reject brush 40. Brush 40 is cylindrical and is rotated about its generally horizontal axis above belt 36. Nipples not properly within openings 38 contact rotating brush 40 and are swept down and back toward hopper 28. Similar brushes are used for collar and hood feeders 6, 8. A more detailed view of the hood reject brush 42 is shown in FIG. 11.

Nipples 10 are thus carried by belt 36 from first portion 34 of an inclined portion 44 past reject brush 40 to a generally horizontal portion 46 terminating at a transfer roller 48. Roller 48 includes several central slots 50 within which the tips of nipples 10 pass. As nipples 10 pass about roller 48, they tend to drop out of openings 38 once below the axis 52 of roller 48. This region is termed the nipple transfer point 54 where nipples 10 are transferred from nipple conveyors 30 to nipple magazine 32. Nipple magazine 32 includes a bottom rail 56 and a pair of side rails 58 which guide nipples 10 along downwardly sloping magazine 32.

COLLAR FEEDER

Figure 4:
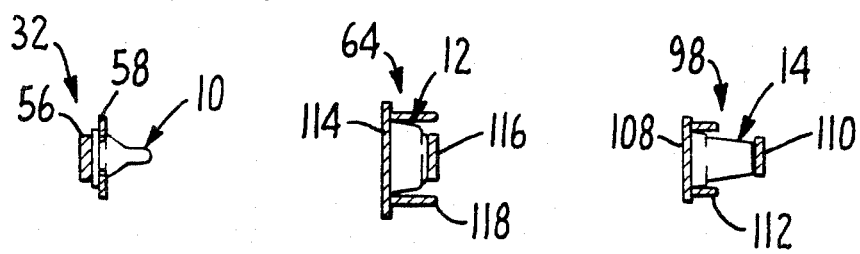
FIG. 4 is a cross-sectional view of the magazines taken along line 4—4 of FIG. 1 illustrating the magazine rails guiding the cap components.

Referring again to FIGS. 1 and 2, collar feeder 6 includes a collar conveyor 60 which transports collars 12 from a collar hopper 62 to a collar magazine 64. Collar conveyor 60 is similar to nipple conveyor 30 and includes a collar reject brush 66 mounted adjacent an inclined portion 68 of conveyor 60 above hopper 62. Referring now also to FIGS. 8-10, conveyor 60 includes a collar conveyor belt 70 having four sets of aligned collar openings 72 formed therein. Collars 12 are supported by a support surface 74 spaced directly beneath the upper reach of collar conveyor belt 70. Thus belt 70 urges collar 12, positioned within opening 72, from collar hopper 62 to a collar transfer point 76. Collars 12 are fed into collar magazine 64 in a like manner as nipples 10 are fed into nipple magazine 32. Collar magazine 64, as shown in FIG. 4, includes bottom, top and side plates 114, 116 and 118, respectively.

Unlike nipples 10 or hoods 14, the slight taper of the outer surface 78 of collars 12 makes sizing opening 72 sufficient small so that only collars in which lip 79 points downwardly, that is toward surface 74, has not proven to be practical. Accordingly openings 72 are sufficiently large so that collars 12 can fit therein with lip 79 supported by surface 74 and also when in the position reversed from that. However to eliminate such improperly oriented collars, indicated by numeral 80 in FIG. 9, a collar diverter 82 is used before or upstream of transfer point 76.

Collar diverter 82 includes a number of trapezoidal blocks 84 positioned above belt 70 and on either side of the rows of openings 72. As shown in FIG. 10, properly oriented collars, indicated by numeral 86, are supported vertically by blocks 84 as they are urged along by belt 70. However, improperly oriented collars 12, such as collar 80, are not so supported so that they drop down through an opening 88 within support plate 74 and thus are diverted away from collar conveyor 60. Collar diverter 82 also includes a diverter path 90 which diverts improperly oriented collars 80 from opening 88 to an auxiliary entrance 92 in magazine 64. Diverter path 90 has a 180° twist in it so that collars passing therealong are flipped over and thus enter magazine 64 with the proper orientation. Collar magazine 64 guides collars 12 from transfer point 76 and auxiliary transfer point 92 to collar pickup point 18 adjacent assembly wheel 22.

HOOD FEEDER

Figure 12:
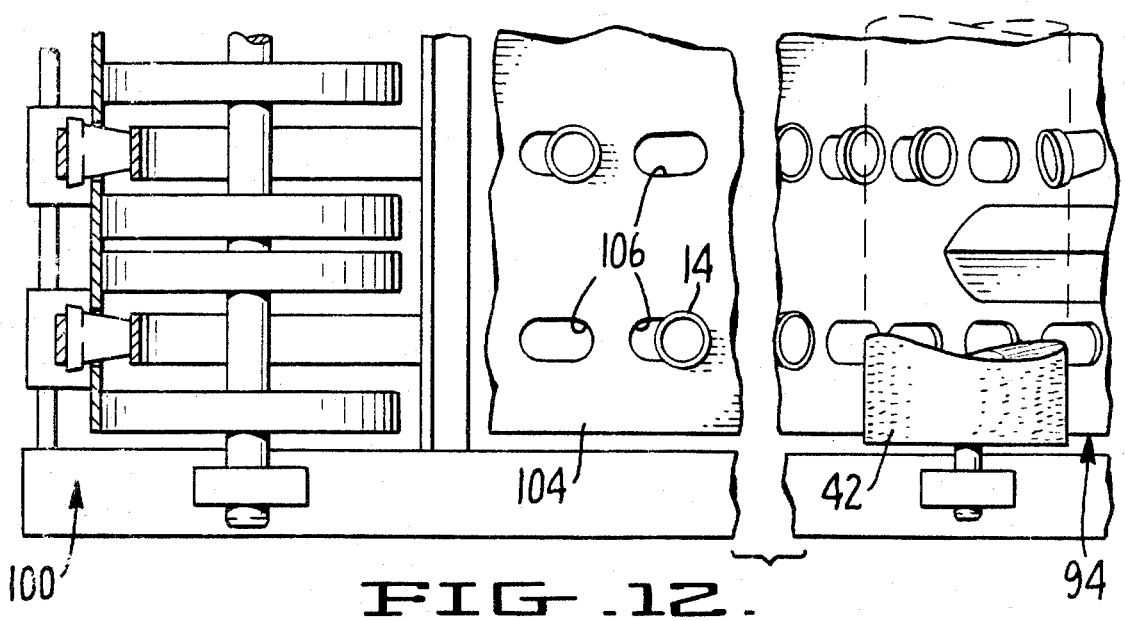
FIG. 12 is a top view taken along line 12—12 of FIG. 11.

Hood feeder 8, shown in FIGS. 1 and 2, includes a hood conveyor 94 which transfer hoods 14 from a hood hopper 96 to a hood magazine 98 at a hood transfer point 100. Referring now also to FIGS. 11 and 12, it is seen that hood conveyor 94 is quite similar to nipple conveyor 30 and thus it will not be described in detail. However, hood reject brush 42 is seen to be positioned above an inclined portion 102 of conveyor 94. Brush 42, as well as brushes 40 and 66, is generally cylindrical and is mounted above a hood conveyor belt 104. Brush 42 is driven to rotate against the direction of movement of belt 104 so that improperly seated hoods are either directed back within the openings 106 in belt 104 or are swept back down towards hood hopper 96. As shown in FIG. 4, downwardly extending hood magazine 98 includes a bottom support plate 108, a top plate 110 and side plates 112.

ASSEMBLY WHEEL

Having described the nipple, collar and hood feeders 4, 6 and 8, assembly wheel 22, which assembles those components, will now be described. Referring to FIGS. 13-17, pickup pins 24 are shown mounted to the periphery 120 of assembly wheel 22. Wheel 22 and pinch roller 26 are rotated by a chain 121 driven by a drive wheel 123. As wheel 22 rotates in the direction of arrow 122, the tip 124 of each pin 24 engages the interior 126 of a nipple 10 at nipple pickup point 16. Nipples 10 are fed to pickup point 16 by nipple magazine 32. Magazine 32 is configured at its pickup end 128 so that nipples 10 do not slide freely past pickup end 128 but are retained there until engaged by a pickup pin 24. The amount of force required to remove a nipple 10 from end 128 can be adjusted by a screw 130.

After leaving end 128, nipple 10 is urged downwardly over a shoulder portion 132 of a base 134 supporting pickup pin 24. This is accomplished by extensions 136 of side rails 58 as shown in FIG. 15.

The nipple covered pin next engages the interior of 138 of a collar 12 positioned at collar pickup point 18. Collar 10 at collar pickup point 18, indicated by numeral 140 in FIG. 15, is temporarily held in place by flexible flap 142 and the distal ends 144 of extensions of 136. As the nipple carrying pin passes collar 140, it picks up the collar and carries it with it. Collar 12 is guided partially over nipple 8 by a pair of L-shaped inclined collar guides 144.

Thereafter, downstream of collar pickup point 18, pin 24 engages the interior 146 of a hood 14 at hood pickup point 20. This hood is indicated by reference numeral 148 in FIG. 15. At this point collar 12 is not fully engaged over nipple 10 and the bead 150 formed at the lower edge 152 of hood 14 is not fully engaged over lip 74 of collar 12. Upon application of an assembly force from pinch roller 26 to the top 153 of hood 14, an edge 154, defining a central opening 156 in collar 12, is forced into a groove 158 formed immediately above a flange 160 on nipple 10 to lock the two components together. At the same time the internally directed bead 150 at the lower edge 152 of hood 14 snaps over lip 79 of collar 12. Thus, collar 12 is not secured to nipple 10 and hood 14 is not attached to collar 12 unless all three cap components are properly mounted to pickup pin 24 when they pass pinch roller 26.

The assembled baby bottle caps 3 are stripped from pickup pins 24 by a cap stripper 162. Stripper 162 includes a pair of spaced apart, curved stripper fingers, shown in FIGS. 3 and 13, the distal ends of which are adjacent periphery 120 of assembly wheel 22. Fingers 164 are spaced apart sufficiently so that they engage the lower edge 166 of collar 12. Stripped caps 3 fall within a cap collection region 168 and are carried away by a cap conveyor 170.

Figure 13:
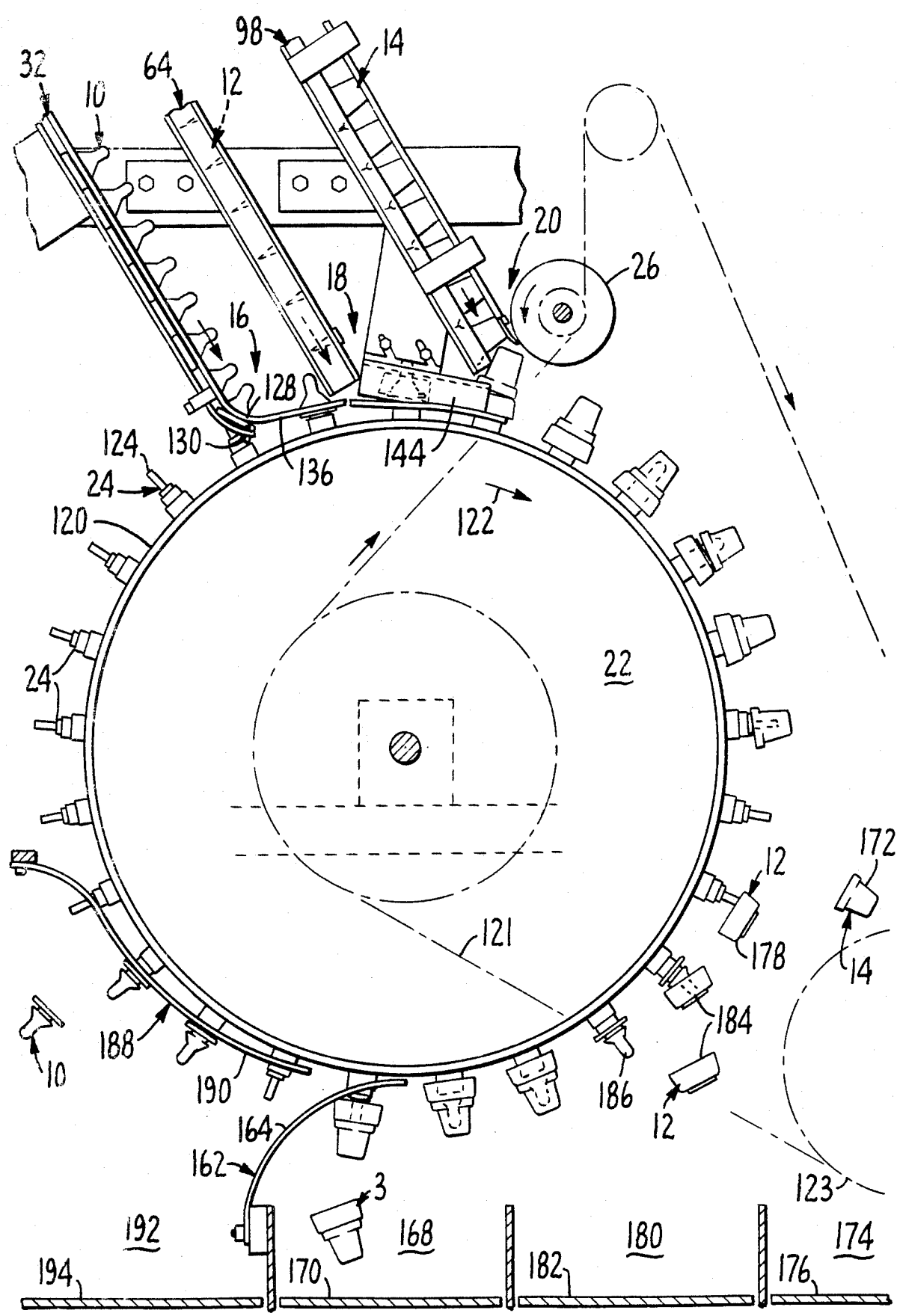
FIG. 13 is an enlarged view of the assembly wheel of FIG. 1.
Figure 14:
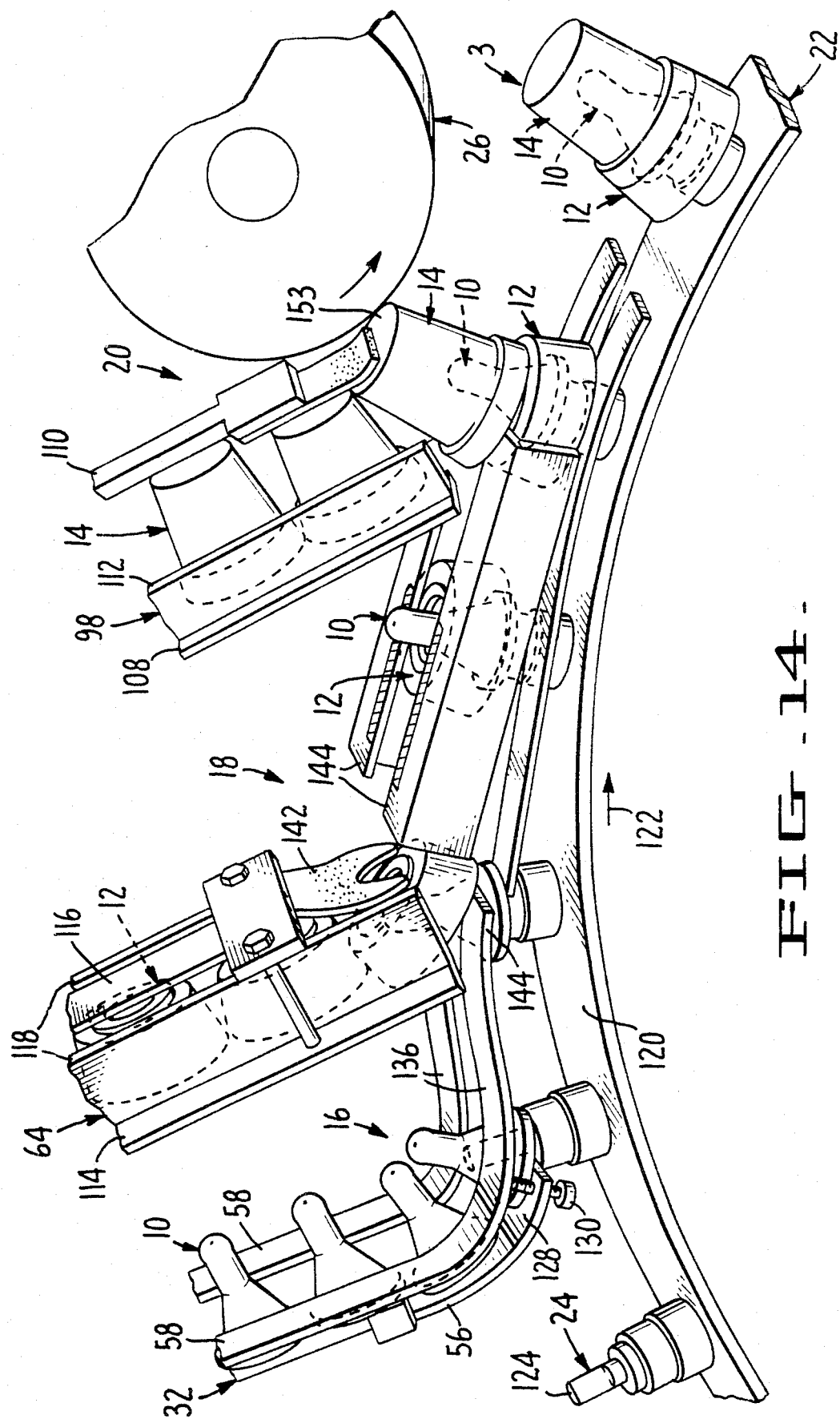
FIG. 14 is an enlarged perspective view of the cap component pickup points and the pinch roller.

At times, one or more of the cap components are not picked up by pins 24. Assuming nipple 10 is not picked up but pin 24 picks up a collar 12 and a hood 14, as collar 12 and hood 14 pass pinch roller 26 they are not snapped together since collar 12 is not supported by flange 160 of nipple 10. Therefore these two cap components fit loosely on pickup pin 24 until they fall off. Hood 14 falls off first as indicated in FIG. 13 by reference numeral 172 and lands in a hood reject region 174 where it is carried away by a hood reject conveyor 176. Later collar 12, indicated by reference numeral 178, falls from pickup pin 24 into a collar reject region 180 to be carried by a collar reject conveyor 182.

Another misassembly may occur with a nipple 10 being properly picked up by pickup pins 24, but missing either a collar 12 or a hood 14. In either event, pinch roller 26 fails to force the cap components together so that hood 14 or collar 12 drop within their respective reject regions 174, 180. Examples of collars 12 dropping from a nipple covered pickup pin 24 are indicated by reference numeral 184. As shown in FIG. 15 and discussed above, extension 136 pushed nipple 10 over shoulder 132 so that nipple 10 does not fall away from assembly wheel 22 as the wheel rotates. However, cap stripper fingers 164 are spaced far enough apart (see FIG. 3) so that a nipple 10, such as that indicated by reference numeral 186, can pass between fingers 164. Nipple stripper 188, located downstream of cap stripper 162, includes a pair of nipple stripper fingers 190, shown in FIGS. 3 and 13, spaced closely enough so that they underlie flange 160 of nipple 10. As assembly wheel 22 rotates, any nipples remaining on pins 24 are forced to ride up fingers 190 until they disengage from pickup pins 24 and fall within a nipple reject region 192 to be carried away by a nipple reject conveyor 194.

OPERATION

In use, quantities of nipples 10, collars 12 and hoods 14 are loaded into hoppers 28, 62 and 96. Conveyors 30, 60 and 94 are driven picking up their associated cap components within their respective openings 38, 72 and 106 in respective belts 36, 70 and 104. Improperly positioned components are swept back down toward the hoppers by reject brushes 40, 66, and 42.

Nipples 10 and hoods 14 are transferred to nipple and collar magazines 32, 98 at transfer points 54 and 100. Properly oriented collars 12 are fed into collar magazine 64 at transfer point 76 while improperly oriented collars are diverted from collar conveyors 60, inverted and fed to collar magazine 64 at an auxiliary transfer point 92 by collar diverter 82.

Nipples are serially picked up by pickup pins 24 at nipple pickup point 16 and seated onto shoulder 132 by extensions 136; a collar 12 and a hood 14 are then stripped from their respective magazines at pickup points 18 and 20. Pinch roller 26, pressing downwardly on hood 14, causes the cap components to engage one another to form an assembled baby bottle cap 3. Cap 3 is stripped from pickup pin 24 by a pair of curved fingers 164 which engage the lower edge 166 of collar 12 causing cap 3 to ride up fingers 164 and off of pickup pins 24. Caps 3 are collected in cap collection region 168 as they fall from assembly wheel 22 and are carried away by cap conveyor 170.

If the cap components are improperly assembled, hoods 14 fall away from assembly wheel 22 into hood reject region 174, then collars 12 fall away into collar reject region 180 between the hood reject and cap collection regions 174, 168. Any nipples 10 remaining on pickup pins 24 are stripped from the pickup pins by a pair of nipple stripper fingers 190 which force the nipples off the pickup pins and into nipple reject region 192 as the nipples ride up the outer surface of fingers 190.

Modification and variation can be made to the disclosed embodiment without departing from the subject invention as defined in the following claims. For example, a belt may be used, in lieu of wheel 22, to transport pickup pins 24 along a circular or non-circular path. Also, cap components may be fed into their respective magazines using apparatus other than the component conveyors.

We claim:

1. A baby bottle cap component assembler for use in assembling a baby bottle cap of the type including a nipple, a collar sized to fit over the nipple, and a hood mounted to the collar and adapted to fit over an end of the nipple extending through the collar, the assembler comprising:
   a plurality of pickup pins sized for insertion into the hollow interior of the nipples;
   a pickup pin carrier for movement of said pick-up pins along a pickup pin path;
   means for driving said pickup pin carrier;
   feed means for serially supplying nipples, collars and hoods to respective nipple, collar and hood pickup points near said pickup pin path, said collar pickup point being downstream of said nipple pickup point and said hood pickup point being downstream of said collar pickup point;
   said nipple, collar and hood pickup points positioned and said feed means arranged and adapted so as said pickup pin carrier is driven by said driving means, one said pickup pin engages the interior of a nipple at said nipple pickup point and strips the nipple from said nipple feed means, the nipple carried by said pickup pin engages the interior of a collar at said collar pickup point and strips the collar from said collar feed means, and the nipple carried by said pickup pin engages the interior of a hood at said hood pickup point and strips the hood from said hood feed means so a nipple/collar/hood combination is carried by the pickup pin; and
   means, located downstream from said hood pickup point, for locking said nipple/collar/hood combination together.

2. The assembler of claim 1 wherein said pickup pin carrier includes an assembly wheel mounted for rotation about a generally horizontal axis and having said pickup pins mounted to the periphery of said assembly wheel to extend radially therefrom.

3. The assembler of claim 1 wherein said nipple/collar/hood locking means includes pinch roller means for pressing said hood towards the nipple and collar.

4. The assembler of claim 3 wherein said locking means includes means for rotatably driving said pinch roller.

5. The assembler of claim 1 further comprising an assembly stripper means for removing said nipple/collar/hood combination from said pickup pin.

6. The assembler of claim 5 wherein said assembly stripper means includes at least one elongate element having a tip adjacent the pickup pin path and positioned so said element engages said nipple/collar/hood combination and forces said combination off said pickup pin as said pickup pin is driven past said assembly stripper.

7. The assembler of claim 1 further comprising a nipple stripper mounted adjacent the pickup pin path and adapted to engage the bottom of any said nipple carried by said pickup pins as said nipples pass thereby and force said nipple off of said pickup pin.

8. The assembler of claim 1 further comprising a reject conveyor, underlying said pickup pin carrier, for carrying away improperly assembled baby bottle top components.

9. The assembler of claim 8 further comprising:
   a plurality of said reject conveyors; and
   a nipple/collar/hood assembly conveyor underlying said pickup pin carrier for carrying away properly assembled baby bottle caps.

10. The assembler of claim 1 wherein said feed means includes a nipple feeder, a collar feeder and a hood feeder.

11. The assembler of claim 10 wherein said feed means includes a nipple magazine assembly, a collar magazine assembly, and a hood magazine assembly said magazine assemblies adapted to hold a plurality of nipples, collars and hoods respectively.

12. The assembler of claim 11 wherein said nipple magazine assembly is positioned to gravity feed said nipples to said nipple pickup point.

13. The assembler of claim 11 wherein said feed means includes nipple, collar and hood hoppers containing a plurality of nipples, hoods and collars respectively.

14. The assembler of claim 13 wherein said nipple, collar and hood feeders include a hood conveyor, a collar conveyor and a nipple conveyor arranged and adapted to transport nipples, collars and hoods from said nipple, collar and hood hoppers to said nipple, collar and hood magazine assemblies respectively.

15. The assembler of claim 14 wherein said nipple feeder includes:
   a nipple magazine having guide rails for supportably guiding said nipples; and
   transfer assembly means for transferring nipples from said nipple conveyor to said nipple magazine.

16. The assembler of claim 1 wherein said feed means includes:
   a collar hopper holding a plurality of collars;
   a collar conveyor for transporting collars from said collar hopper to a collar transfer point;
   a collar magazine adapted for guidably housing a plurality of collars to feed collars to said collar pickup point; and
   means for transferring the collars from said collar conveyor at said collar transfer point to said collar magazine.

17. The assembler of claim 16 wherein said collar transfer means includes means for diverting collars having a reverse orientation on said collar conveyor prior to reaching said collar transfer point.

18. The assembler of claim 17 wherein said diverting means includes a supplementary collar path arranged and adapted to correct the orientation of reverse oriented collars by turning said collar over and feeding the reorientated collar into said collar magazine.

19. The assembler of claim 16 wherein said collar conveyor includes a belt having a plurality of holes, means for guiding said belt along a collar conveyor path from said collar hopper to said collar transfer point and back to said collar hopper, a first portion of said collar conveyor path in contact with said collars within said collar hopper.

20. The assembler of claim 19 wherein said collar conveyor path includes a second, inclined portion above which is mounted a rotatable reject brush means for sweeping improperly positioned collars back down said second conveyor path portion.

21. The assembler of claim 19 wherein said belt includes holes having a diameter larger than the diameter of said collar, said collar conveyor also including a support plate beneath said belt along said first and second path portions, said support plate spaced apart from said belt at a distance less than the height of said collars so said collars are supported by said support plate as said collars are moved along said first and second conveyor path portions by said belt.

22. A baby bottle cap component assembler for use in assembling a baby bottle cap of the type including a nipple, a collar sized to fit over the nipple, and a hood mounted to the collar and adapted to fit over an end of the nipple extending through the collar, the assembler comprising:
   a plurality of pickup pins sized for insertion into the hollow interior of the nipples;
   a pickup pin carrier for movement of said pick-up pins along a pickup pin path;
   means for driving said pickup pin carrier;
   feed means for serially supplying nipples, collars and hoods to respective nipple, collar and hood pickup points near said pickup pin path, said collar pickup point being downstream of said nipple pickup point and said hood pickup point being downstream of said collar pickup point;
   said nipple, collar and hood pickup points positioned and said feed means arranged and adapted so as said pickup pin carrier is driven by said driving means, one said pickup pin engages the interior of a nipple at said nipple pickup point and strips the nipple from said nipple feed means, the nipple carried by said pickup pin engages the interior of a collar at said collar pickup point and strips the collar from said collar feed means, and the nipple carried by said pickup pin engages the interior of a hood at said hood pickup point and strips the hood from said hood feed means so a nipple/collar/hood combination is carried by the pick-up pin;
   a pinch roller, located downstream from said hood pickup point, for locking said nipple/collar/hood combination together by pressing on the hood passing thereby; and
   an assembly stripper means for removing said nipple/collar/hood combination from said pickup pin.

23. A baby bottle cap component assembler of claim 22 wherein said serially supplying feed means includes nipple, collar and hood magazines positioned and configured to gravity feed said nipples, collars and hoods to said respective pickup points.

* * * * *